US011654815B2

(12) United States Patent
Mate et al.

(10) Patent No.: US 11,654,815 B2
(45) Date of Patent: May 23, 2023

(54) CLOSED CENTER HOIST VALVE WITH SNUBBING

(71) Applicant: Caterpillar Inc., Peoria, IL (US)

(72) Inventors: Edward William Mate, Manhattan, IL (US); William N. O'Neill, Eureka, IL (US); Dennis William Dicker, Devonport (AU)

(73) Assignee: Caterpillar Inc., Peoria, IL (US)

( * ) Notice: Subject to any disclaimer, the term of this patent is extended or adjusted under 35 U.S.C. 154(b) by 168 days.

(21) Appl. No.: 17/164,512

(22) Filed: Feb. 1, 2021

(65) Prior Publication Data
US 2022/0242295 A1    Aug. 4, 2022

(51) Int. Cl.
*F15B 11/04* (2006.01)
*B60P 1/16* (2006.01)
*G05D 7/01* (2006.01)

(52) U.S. Cl.
CPC .............. *B60P 1/162* (2013.01); *F15B 11/04* (2013.01); *G05D 7/014* (2013.01); *F15B 2211/30505* (2013.01); *F15B 2211/3111* (2013.01); *F15B 2211/3127* (2013.01); *F15B 2211/3144* (2013.01); *F15B 2211/31576* (2013.01); *F15B 2211/329* (2013.01); *F15B 2211/7053* (2013.01); *F15B 2211/7741* (2013.01)

(58) Field of Classification Search
CPC .................. F15B 11/04; F15B 11/0413; F15B 2211/3111; F15B 2211/3127
See application file for complete search history.

(56) References Cited

U.S. PATENT DOCUMENTS

| 5,546,847 | A | 8/1996 | Rector | |
|---|---|---|---|---|
| 7,353,744 | B2 * | 4/2008 | Dixen | F15B 11/05 91/446 |
| 7,788,916 | B2 * | 9/2010 | Brockman | F15B 11/05 60/427 |
| 9,120,416 | B2 * | 9/2015 | Minoshima | B60P 1/16 |

(Continued)

FOREIGN PATENT DOCUMENTS

| EP | 0247303 B1 | 11/1991 |
|---|---|---|
| EP | 1108895 B1 | 7/2003 |

(Continued)

OTHER PUBLICATIONS

Written Opinion and International Search Report for Int'l. Patent Appln. No. PCT/US2022/014225, dated May 11, 2022 (14 pgs).

*Primary Examiner* — Michael Leslie
(74) *Attorney, Agent, or Firm* — Schwegman Lundberg & Woessner, P.A.

(57) ABSTRACT

A valve for controlling a hydraulic cylinder on a work machine may include a raising position configured for placing a pump in fluid communication with a cap end of the hydraulic cylinder. The valve may also include closed center position configured for closing off fluid communication to the cap end line and the rod end line. The valve may also include a lowering position configured for placing the pump in fluid communication with the rod end of the hydraulic cylinder. The valve may also include a snubbing position configured for placing the cap end in restricted flow fluid communication with the tank and for placing the rod end in restricted flow fluid communication with the tank.

16 Claims, 9 Drawing Sheets

(56) References Cited

U.S. PATENT DOCUMENTS

| | | | |
|---|---|---|---|
| 9,174,562 B2 | 11/2015 | Uozu et al. | |
| 9,790,964 B2 * | 10/2017 | Johnson | F15B 11/165 |
| 10,472,804 B2 | 11/2019 | Yamashita et al. | |
| 11,231,052 B2 * | 1/2022 | Anton | B60G 17/056 |
| 2003/0141132 A1 * | 7/2003 | Kowalyk | A01B 63/1013 |
| | | | 180/306 |
| 2006/0156914 A1 | 7/2006 | Dixen | |
| 2013/0035828 A1 | 2/2013 | Tamura | |

FOREIGN PATENT DOCUMENTS

| | | | |
|---|---|---|---|
| EP | 1281872 B1 | 6/2005 | |
| EP | 1672225 A2 * | 6/2006 | F15B 11/05 |
| EP | 3281508 B1 | 5/2019 | |
| JP | 2013248928 | 12/2013 | |

* cited by examiner

CLOSED CENTER HOIST VALVE WITH SNUBBING

TECHNICAL FIELD

The present application relates generally to hydraulic systems such as those used on work machines including trucks or other heavy equipment for construction, farm implements, and other machines adapted for performing work. More particularly, the present application relates to a truck hoist valve for controlling hydraulic cylinders that lift and lower truck beds or other vessels. Still more particularly, the present application relates to a closed center truck hoist valve that includes snubbing.

BACKGROUND

Truck hoist valves come in a variety of designs based on the type and/or size of the truck, the hauling conditions anticipated for the truck, the raising, lowering, and operating features desired for the system, whether the hydraulic systems have fixed or variable displacement pumps, and several other factors. In one example, a fixed displacement hydraulic pump system may have a five-position valve including a raise position for raising the truck bed, a series of lowering positions for differing degrees/rates of lowering, and a center position for relatively rigidly holding the truck bed position relative to the frame. In another example, a variable displacement pump system may have a four-position valve including a raise position for raising the truck bed, a lowering position for lowering the truck bed, a center position for relatively rigidly holding the truck bed position relative to the frame, and a float position for allowing the truck bed to move relatively freely of hydraulic restriction relative to the frame of the truck.

In comparing the above systems, the variable displacement pump system may have fewer degrees of control over the engagement between the truck bed and the frame during lowering. However, the variable displacement pump system may, instead, include the float position. This may be helpful so the operator may select between holding the truck bed secure to the frame (e.g., center position) or allowing the truck bed to move more freely relative to the frame (e.g., float position) when the operator is driving the truck from one location to another.

These differences can lead to a desire to select from a variety of features when creating a valve. However, the various features described may not lend themselves toward incorporation into differing systems. Moreover, desired features of a valve may raise problems associated with the elaborate nature of the valve (e.g., too many valve positions). Still further, feature incorporation can lead to problems relating to figuring out how to implement the desired features at all given the context of the system.

U.S. Pat. No. 10,472,804 to Yamashita et al. relates to a hydraulic control system of a construction machine. Yamashita et al. discuss a hydraulic system that achieves a reduction in meter-out pressure loss in accordance with variation of a negative load acting on a hydraulic actuator. In particular, a hydraulic fluid discharged from the actuator flows through meter-out flow lines having variable restrictors. A load sensor detects the magnitude of a negative load applied to the actuator by an external force in the same direction as the operating direction of the actuator. A control device reduces the sum total of the opening areas of the variable restrictors in accordance with an increase in the magnitude of the negative load detected by the load sensor and the operation amount detected by the operation amount sensor when the load abnormality sensor does not detect any abnormality. When an abnormality is detected, it reduces the sum total of the opening areas to a predetermined value in accordance with the operation amount detected by the operation amount sensor.

SUMMARY

In one or more embodiments, a valve for controlling a hydraulic cylinder on a work machine may include a raising position configured for placing a pump in fluid communication with a cap end of the hydraulic cylinder via a cap end line and for placing a tank in fluid communication with a rod end of the hydraulic cylinder via a rod end line. The valve may also include a closed center position configured for closing off fluid communication to the cap end line and the rod end line. The valve may also include a lowering position configured for placing the pump in fluid communication with the rod end of the hydraulic cylinder via the rod end line and for placing the tank in fluid communication with the cap end of the hydraulic cylinder via the cap end line. The valve may also include a snubbing position configured for placing the cap end in restricted flow fluid communication with the tank via the cap end line and for placing the rod end in restricted flow fluid communication with the tank via the rod end line.

In one or more embodiments, a hydraulic system for raising and lowering a truck bed relative to a frame may include a tank and a variable displacement pump in fluid communication with the tank to supply pressurized hydraulic fluid. The system may also include a hydraulic cylinder configured for extending and retracting to pivot the truck bed relative to the frame and having a cap end and a rod end. The system may also include a valve arranged between the tank and the hydraulic cylinder and between the variable displacement pump and the hydraulic cylinder. The valve may include a raising position, a closed center position, a lowering position, and a snubbing position configured for placing the cap end in restricted flow fluid communication with the tank via a cap end line.

In one or more embodiments a method of operating a work machine may include operating a valve in a raising position to raise a truck bed of the work machine with a hydraulic cylinder, operating the valve in a lowering position to lower the truck bed with the hydraulic cylinder, and operating the valve in a snubbing position as the truck bed approaches a frame of the work machine. The snubbing position may place a cap end of the hydraulic cylinder in fluid communication with the tank and restrict flow out of the cap end of the cylinder. The snubbing position may also place a rod end of the hydraulic cylinder in fluid communication with the tank and restrict flow into the rod end of the cylinder.

DETAILED DESCRIPTION

Figure 1:
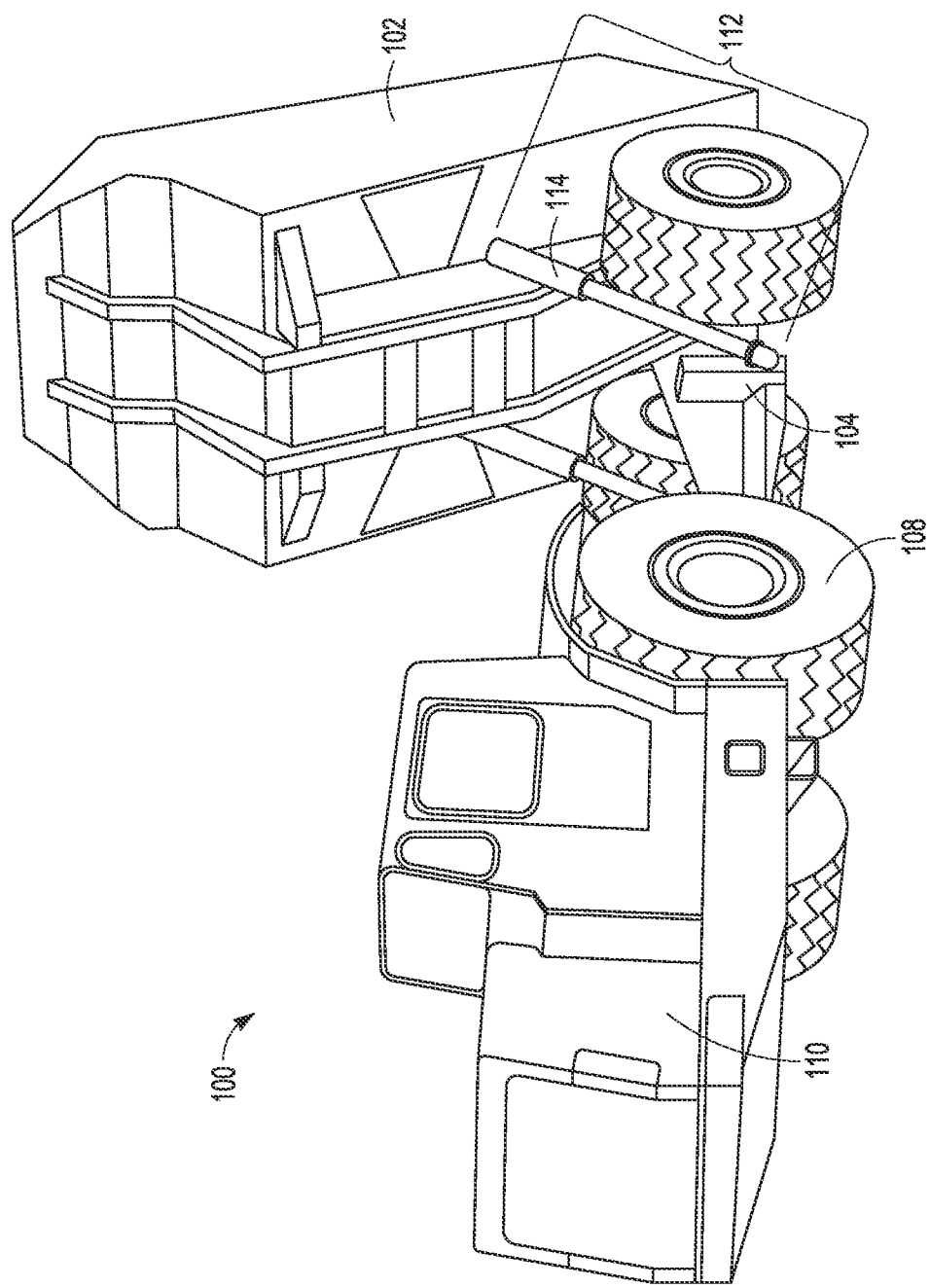
FIG. 1 is a perspective view of a work machine having a bed/vessel lifted by a hydraulic system, according to one or more embodiments.

FIG. 1 is a perspective view of a work machine 100. As shown, the work machine 100 may be an underground mining truck used in mining operations. The mining truck may include a bed or vessel 102 adapted for receiving mined material or other material, securing or storing the material during transportation from one location to another and for dumping the material. For purposes of dumping the material, the bed or vessel 102 may have a hinged connection to a frame 104 of the work machine 100 at one end and an opposite free end. The bed or vessel 102 may be operable using a hoist such as a hydraulically driven hoist system 112. The work machine may include a plurality of ground supporting traction elements 108 (e.g., wheels, tracks, skid feet, etc.) for translating the work machine relative to a supporting surface. The traction elements 108 may be coupled to a frame 104 of the work machine 100 with a suspension system. The work machine 100 may include an engine or motor 110 to generate power and to drive the traction system 108, the hoist system 112, and other onboard equipment or systems.

In FIG. 1, the bed or vessel 102 is shown in a raised and/or dumping position. In particular, a pair of hydraulic cylinders 114 are shown in an extended position having caused the bed or vessel 102 to pivot about its hinged connection to the frame 104 to place the bed or vessel in the raised and/or dumping position. As may be appreciated, retracting the hydraulic cylinders 114 may cause the bed or vessel 102 to pivot downward from the raised position and return to a generally or substantially horizontal position generally parallel with the frame 104 and/or resting on the frame 104.

Figure 2:
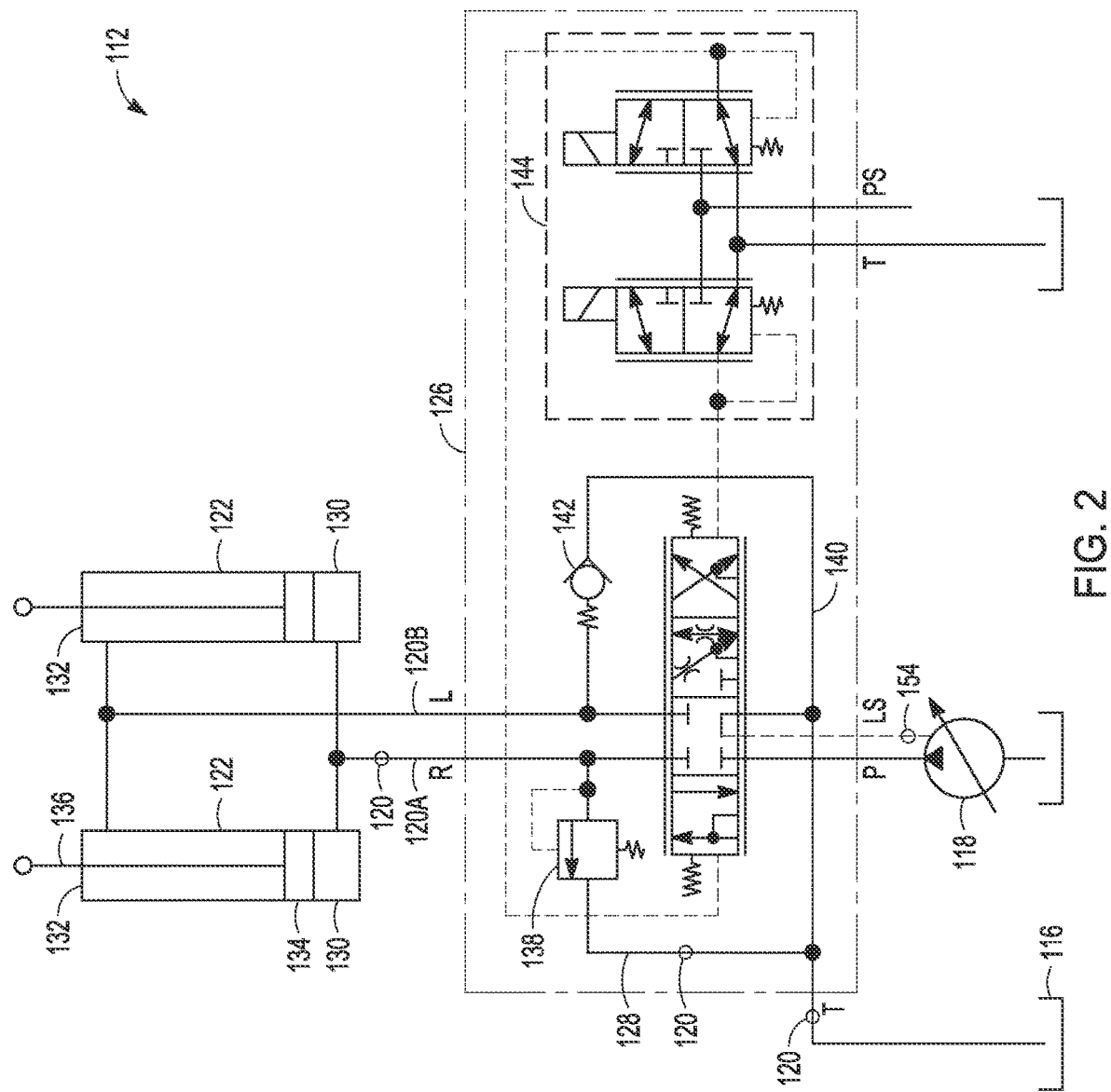
FIG. 2 is a hydraulic schematic of a truck hoist system including a closed center hoist valve with snubbing, according to one or more embodiments.

Referring now to FIG. 2, the hydraulic system 112 of the work machine is shown schematically. The hydraulic system 112 may be configured for controllably pivoting the bed or vessel 102 of the work machine 100 throughout a full range of tilting or pivoting motion between a bottom position where the bed or vessel 102 may rest against one or more stops on the work machine frame 104 and a full tilt position where the hydraulic cylinders 114 may be at their fullest available extension. In one or more embodiments, the bed or vessel 102 and cylinder geometry may result in a full tilt position ranging from approximately 45 degrees to 90 degrees or from approximately 60 degrees to 85 degrees, or approximately 80 degrees. Still other ranges of tilt may be provided. As shown, the hydraulic system 112 may include a tank or reservoir 116, a pump 118, a series of hydraulic lines 120, one or more cylinders 122, and a main valve 126.

The hydraulic reservoir 116 may be configured for holding a supply of hydraulic fluid for use by the system. The hydraulic reservoir 116 may include a holding tank, for example. The tank may be generally closed to prevent intrusion of contaminants, but may include valves or other ports allowing the tank to be maintained at or near atmospheric pressure or another baseline pressure. The holding tank may contain a supply of hydraulic fluid that may be driven to the hydraulic pump 118 based on the atmospheric or other baseline pressure and delivered at a higher pressure by the pump to a pressurized portion of the system. Various relief valves, check valves, and/or return lines may deliver the hydraulic fluid back to the holding tank in particular conditions or circumstances.

The hydraulic pump 118 may be arranged in fluid communication with the hydraulic reservoir 116 and may operate to create a pressure below the tank pressure on an intake side and a higher pressure on an output side. As such, the pump may draw fluid from the hydraulic reservoir 116 and deliver it to the operative side of the system. For example, the pump 118 may deliver the fluid to extend one or more hydraulic cylinders 122 when the valve 126 is operated accordingly. The pump may be designed to deliver a selected range of fluid flow suitable for the particular system being provided. In one or more embodiments, the pump may include a load sensing variable displacement pump.

The variable displacement load sensing pump 118 may be controlled by a load sense signal circuit 154. When the main valve 126 is opened to provide flow to the load, or cylinders 122 in this system, the load sense circuit 154 may be supplied with pressure created by the work being done. The variable displacement load sensing pump 118 may provide sufficient flow for the pump discharge flow to maintain a margin over the load sense pressure unless the pump reaches maximum displacement without achieving this margin pressure. Margin may provide for a system pressure somewhat greater than the load sense signal, for example. In one or more embodiments, maximum raise pressure may be limited by the pressure relief branch 128 discussed in more detail below. As such, the pressure relief branch 128 may limit the pressure in the load sense circuit. In one or more embodiments, the variable displacement load sensing pump 118 may also be designed to limit the maximum pump discharge pressure to a pressure below the pressure setting of the pressure relief branch 128.

The hydraulic lines 120 may extend from the pump to the main valve and from the main valve to the hydraulic cylinders, back to tank, and/or to other aspects of the system. The hydraulic lines 120 may include flexible or rigid pressure resisting lines capable of maintaining the hydraulic fluid at pressures created by the circuit and delivering the hydraulic fluid.

The hydraulic cylinders 122 may be configured for performing work by extending and/or retracting. The hydraulic cylinders 122 may include a housing with a cap end 130 and a rod end 132. The cylinder 122 may include a piston 134 arranged within the housing and configured to articulate through a stroke length within the housing. The cylinder 122 may include a rod 136 coupled to the piston and extending out the rod end of the housing. The housing may include one or more ports for receiving and/or ejecting hydraulic fluid to fill or remove fluid from the housing on one or more sides of the piston causing the piston to articulate back and forth within the housing to extend or retract the piston rod. For example, the hydraulic cylinder 122 may include a port on a cap end of the housing and a port on a rod end of the housing. In the present case of an underground mining truck, the system may include a pair of bed or vessel lifting cylinders 122 for raising and lowering the bed or vessel of the truck. As shown in FIG. 1, the housing of the cylinder 122 may be secured to the bottom of the bed or vessel with a pinned or pivoting connection and the rod 136 may extend out of the housing and be pinned to the frame 104 of the work machine or truck. In other embodiments, an opposite orientation may be provided. While a single stage cylinder is shown, multi-stage cylinders may also be provided.

With continued reference to FIG. 2, the main valve 126 may be provided for controlling the flow of hydraulic fluid to and from the hydraulic cylinders 122. While discussed in more detail below, generally, the main valve 126 may be in fluid communication with the variable displacement pump 118 and the hydraulic cylinders 122. In particular, the main valve 126 may be arranged between (e.g., fluidly between such that fluid flow passes through the valve to get to the cylinders) the pump 118 and the hydraulic cylinders 122. A pair of hydraulic lines 120 in the form of a cap end line 120A and a rod end line 120B are provided between the main valve 126 and the hydraulic cylinders 122 where the cap end line 120A extends from the valve 126 and leads to the cap end 130 of the hydraulic cylinders 122 and the rod end line 120B returns from the rod end 132 of the cylinder 122 to the valve 126. While described as "leads" to and "returns" from, each of the cap end line 120A and the rod end line 120B may be bi-directional lines. The cap end line 120A may include a pressure relief branch 128 that bypasses the valve spool and returns to the tank 116. The pressure relief branch 128 may include a pressure relief valve 138 for limiting the amount of pressure in the cap end line 120A. The rod end line 120B may include a flow path 140 that also bypasses the valve spool and connects to the tank 116. The flow path 140 may include a spring-loaded check valve 142 oriented to prevent fluid flow to the tank 116, but allowing fluid flow to the rod end line 120B from the tank 116 under particular pressure situations discussed in more detail below.

Figure 3:
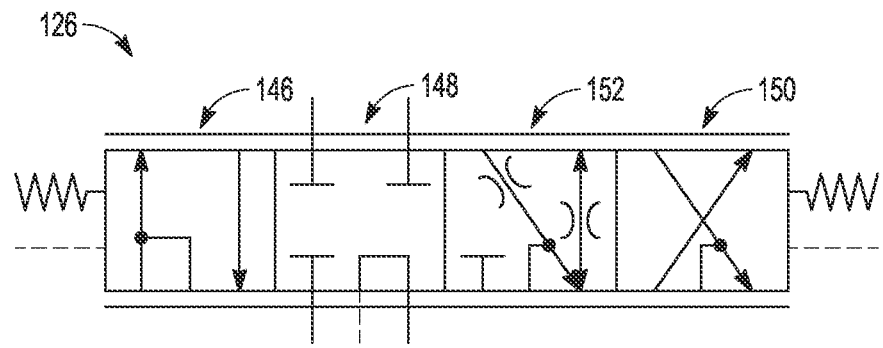
FIG. 3 is an isolated detailed view of the schematic of the closed center hoist valve depicted in FIG. 2, according to one or more embodiments.

Turning now to FIG. 3, the main valve 126 may be a multi-position valve configured to selectively control the flow of hydraulic fluid to and from the hydraulic cylinders 122. In particular, the main valve 126 may be a four position, spring-centered valve, with a closed center position 148. In other embodiments, the valve 126 may be solenoid centered or otherwise centered and may have fewer or additional valve positions. As previously shown in FIG. 2, the valve may include a hydraulic control 144 for selecting between the several positions. For purposes of discussion, the valve positions may be referenced as a raising position 146, a closed center position 148, a lowering position 150, and a snubbing position 152. Each of these positions is shown in isolation in FIGS. 4, 5, 6, and 7, respectively, and discussed individually below. For purposes of simplicity, each valve position is shown in conjunction with a single cylinder, but may be in fluid communication with multiple cylinders as shown in FIG. 2 such as 2, 3, 4, or more cylinders.

Figure 4:
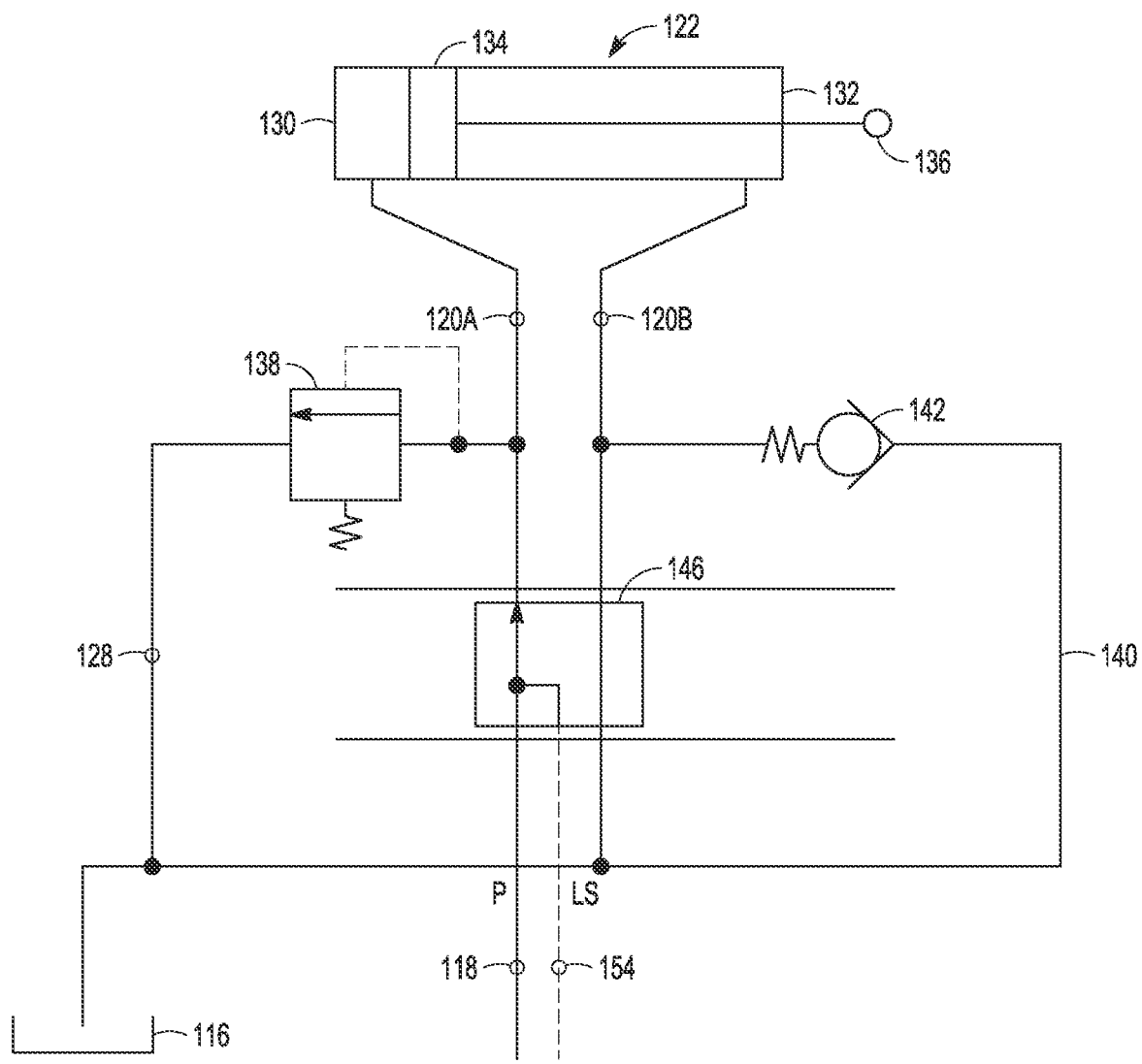
FIG. 4 is close-up view of a raising position of the schematic of the valve of FIG. 3, according to one or more embodiments.

As shown in FIG. 4, the raising position 146 may be configured for extending the rods 136 from the hydraulic cylinder 122 and, as such, raising the truck bed or vessel 102. As shown, the raising position 146 may place the pump in fluid communication with the cap end 130 of the cylinder 122 causing fluid flow from the pump 118, through the valve 126, and into the cap 130 of the cylinder 122. The fluid flow may drive the piston 134 of the cylinder 122 through a stroke length of the cylinder 122 causing extension of rod 136 from the rod end 132 of the cylinder 122, lengthening the hydraulic cylinder 122 and raising the corresponding truck bed or vessel 102. As long as the pressure in the cap end line 120A remains below the pressure set by the pressure relief valve 138, fluid may not flow through the pressure relief branch 128 and may flow to the cylinder 122 as intended. As the piston 134 travels through the cylinder 122, hydraulic fluid may flow out of the rod end port of the cylinder 122 and into the rod end line 120B. As shown, the rod end line 120B may be in fluid communication with the tank 116 through the valve and, as such, fluid may flow out of the rod end 132 of the cylinder 122 and back to the tank 116. The load sense circuit 154 may be in fluid communication with the cap end line 120A and, as such, may provide load sense feedback to the pump. The pump may maintain a fluid flow sufficient to maintain a margin over the pressure in the load sense circuit resulting in providing sufficient fluid flow through the cap end line 120A to raise the truck bed or vessel 102. The valve may be placed in this position to raise the truck bed 102 and may remain in this position unless/until the operator has raised the truck bed or vessel to the desired dumping angle.

Figure 5:
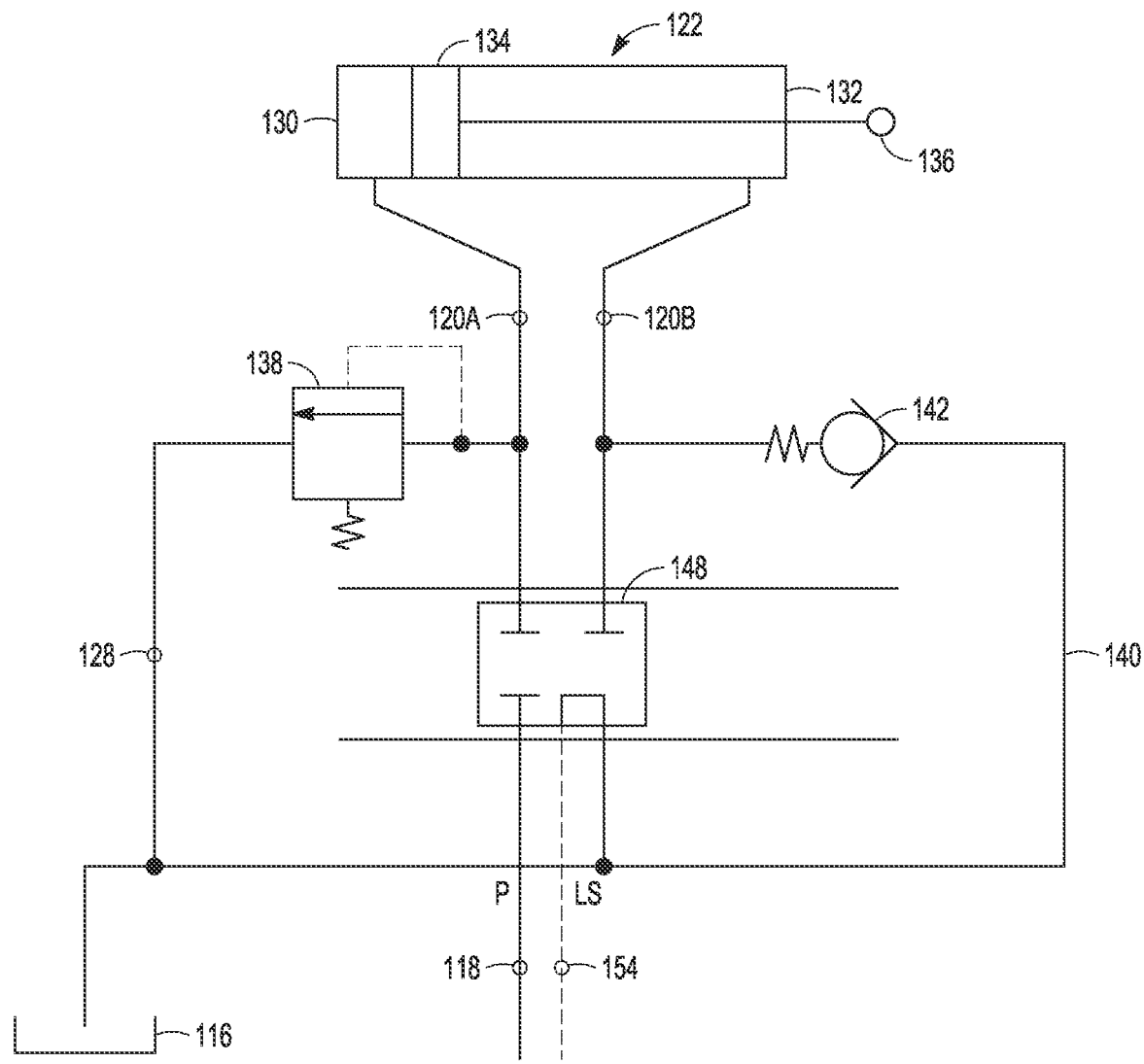
FIG. 5 is a close-up view of a closed-center position of the schematic of the valve of FIG. 3, according to one or more embodiments.

FIG. 5 shows a closed-center position 148, which may be configured to hold the truck bed or vessel 102 at a particular position at some point throughout its stroke. That is, as shown, the closed-center position 148 may create a break or gap in fluid communication between the cap end line 120A and the pump 118 and may also create a break or gap in fluid communication between the rod end line 120A and the tank 116. To be clear, the break or gap also isolates each of the cap end line 120A and rod end line 120B from the tank and pump, respectively, and from each other. As such, when the valve 126 is placed in the closed-center position 148, the fluid volume on the rod side and the cap side of the piston 134 may be fixed and unchanging so long as the pressure relief pressure of the pressure relief valve 138 on the cap end side is not exceeded. In addition, the closed-center position 148 may place the load sense circuit 154 in fluid communication with the tank 116 such that the pump limits its fluid output to an amount only sufficient to maintain a margin over the tank pressure. Given the closed line extending from the pump, the pressure therein may develop quickly and a margin pressure may be maintained with little to no output. As such, the pump will reduce its output or even stop its output.

Figure 6:
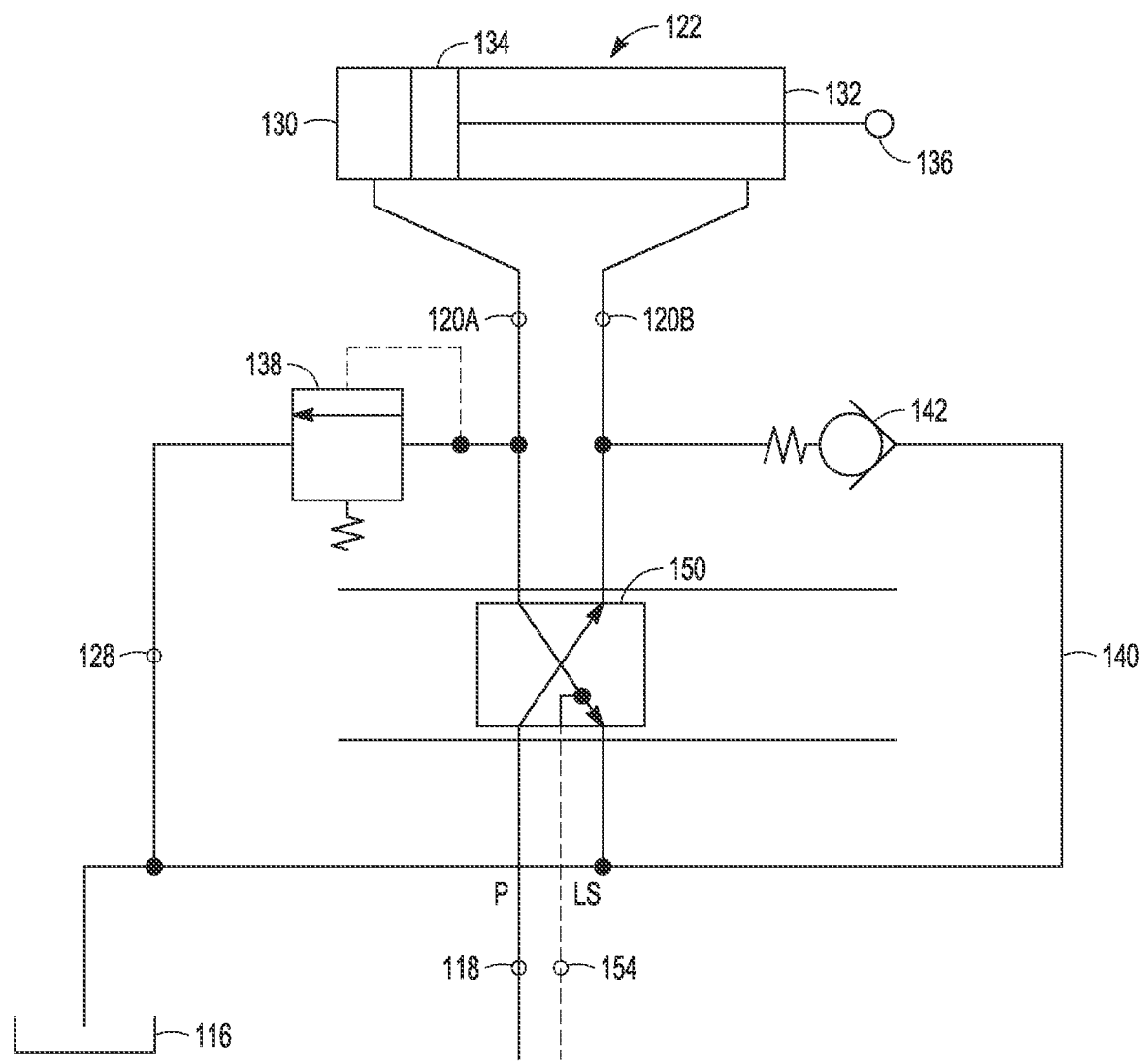
FIG. 6 is a close-up view of a lowering position of the schematic of the valve of FIG. 3, according to one or more embodiments.

FIG. 6 shows the lowering position 150 of the valve 126, which may be configured to lower the truck bed or vessel 102. As shown, and in contrast to FIG. 4, the lowering position 150 may place the cap end line 120A in fluid communication with the tank 116 and may place the rod end line 120B in fluid communication with the pump 118. Further, the load sense circuit is in fluid communication with the tank passage of the valve. As such, the pump 118 may pump fluid to and through the valve 126 to the rod end 136 of the hydraulic cylinder 122. The fluid may enter the rod end to compensate for piston movement toward the cap end, which may be largely driven by gravity lowering of the truck bed. The piston movement may displace the cap end fluid sending the cap end fluid back to the tank via the cap end line 120A. With the reduced pressure in the tank passage of the valve creating minimal load sense signal, the pump 118 may limit its fluid output to maintaining a margin over the relatively low cap line pressure and, as such, supply sufficient fluid to fill the rod end 132 of the cylinder 122, but develop little pressure. If conditions exist such that the pump 118 does not provide enough flow to fill the rod end 132 of the cylinder 122, check valve 142 may open to provide additional fluid from the tank 116. As such, this position may be suitable for lowering the truck bed or vessel under forces of gravity, for example, where the truck bed may be drawn down causing fluid to flow out of the cap end 130 of the cylinder 122 to and through the valve 126 and back to the tank 116. Due to the pressure condition on the cap end line 120A, the pressure setting of the pressure relief valve 138 is not exceeded and fluid may refrain from flowing through the pressure relief branch 128 and may flow back to the tank 116 through the valve 126.

Figure 7:
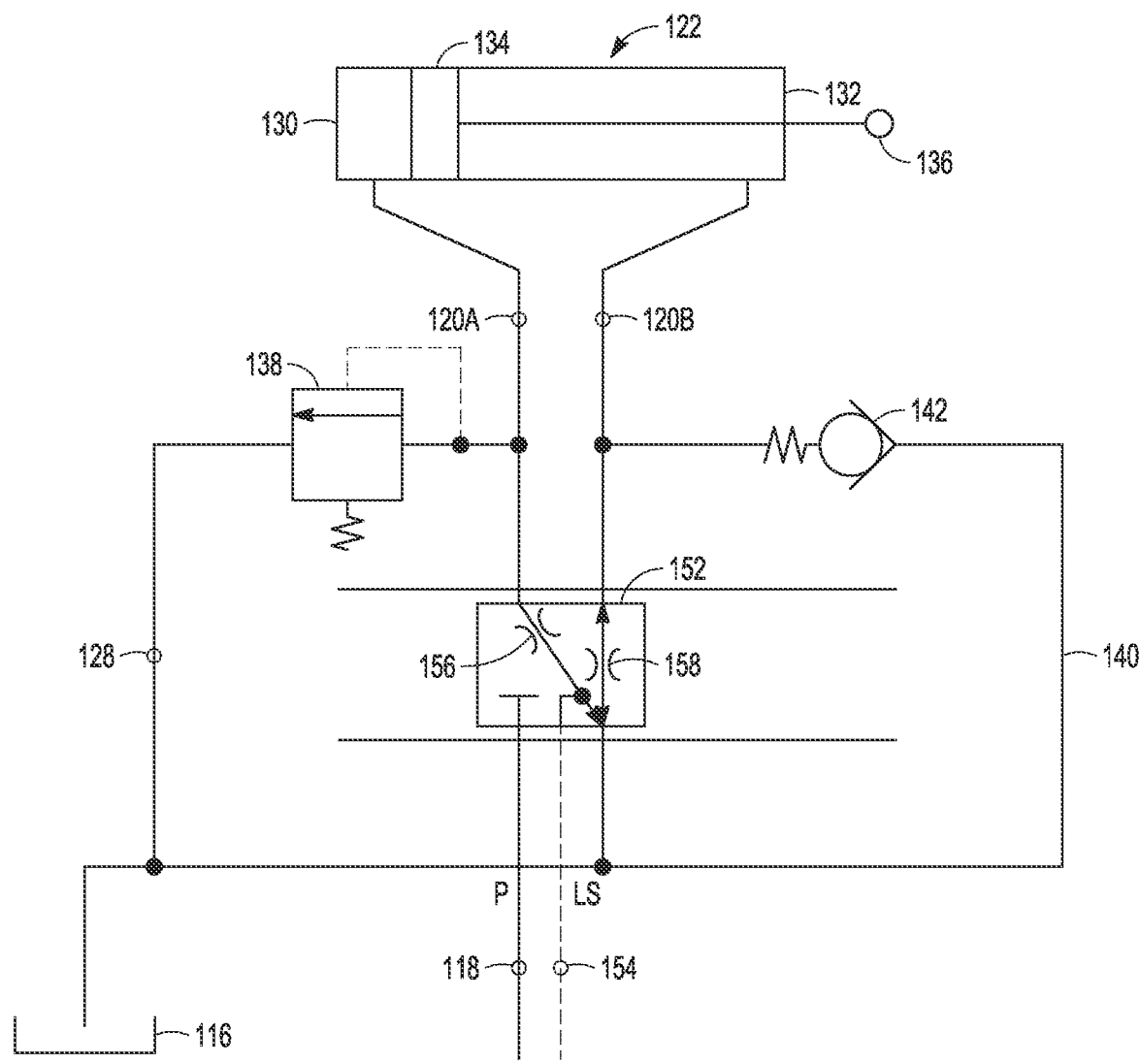
FIG. 7 is a close-up view of a snubbing position of the schematic of the valve of FIG. 3, according to one or more embodiments.

FIG. 7 shows a snubbing position 152 of the valve 126. This valve position 152 may be suitable for use as the truck bed or vessel 102 is approaching its lowered position and is approaching the stops on the frame 108 of the truck or work machine 100 to provide gentle contact with the frame. That is, and for example, if the valve were to remain in the lowering position when the truck bed reached its stop position, pressure would quickly develop in the rod end line 120B and the truck bed 102 would be forced against the frame 104, or the truck bed 102 might contact the frame 104 with forces created by much higher speeds. This snubbing position may be used to prevent damage with reduced cylinder velocity, reduced cylinder force, and reduced impact force from the truck bed 102 contacting the frame 104. Moreover, this snubbing position may also be designed to accommodate travel of the truck with the valve in this position and, as such, may provide the flexibility of a valve having a float position.

As shown, this snubbing position 152 may create a break or gap between the pump 118 and the hydraulic system. Like the center-closed position, the load sense circuit 154 may be placed in fluid communication with the tank 116. This, in combination with a closed line extending from the pump, may cause a margin pressure to be easily maintained and the pump may reduce its output or even stop its output. However, and unlike the center closed position 148, this snubbing position 152 may place the cap end 130 and the rod end 132 of the cylinder 122 in fluid communication with the tank 116. In particular, the valve position 152 places the cap end 130 and rod end 132 in fluid communication with one another at the valve 126 such that fluid flow out of or into one end may be compensated by fluid flow into or out of the other end. However, the fluid flow established by the snubbing position 152 may be restricted flow at particular locations. That is, for example, within the valve 126, the fluid flow between the cap end line 120A and the rod end line 120B/tank 116 may be restricted by a primary restriction orifice 156 or other flow limiting feature in communication with the cap end line 120A as shown. As such, with the valve in this snubbing position 152, the weight of the truck bed or vessel 102 may function to lower the truck bed or vessel 102 under the force of gravity because fluid may be free to flow out of the cap end 130 of the cylinder 122 and back to the tank. However, such lowering may occur at a limited rate due to the restricted flow and, as such, may provide snubbing near the end of the stroke of the cylinder 122 allowing the truck bed to approach the stops gently and to avoid hydraulically forcing the truck bed against the stops upon reaching the stops.

With continued reference to FIG. 7, an additional secondary restriction orifice 158 or other flow limiting feature may be provided within the valve 126 in fluid communication with the rod end line 120B such that fluid flow between the rod end line 120B and the cap end line 120A/tank 116 is also restricted. This restriction may limit the rate of fluid flow into the rod end 132 of the cylinder 122 and, as such, check valve 142 may come into operation. That is, this secondary restriction orifice 158 may cause the pressure in the rod end line 120B to be lower than the tank pressure 116 in some situations and the pressure differential may rise to a designated amount that exceeds the check valve setting. When this occurs, flow path 140 may supply fluid to the rod end line 120B to avoid voiding. For example, where the pressure in the rod end line 120B is reduced below the tank pressure by an amount sufficient to overcome the spring force of the spring-loaded check valve 142, the spring-loaded check valve 142 may open allowing fluid to flow from the tank 116 to the rod end line 120B. This may prevent pressures in the rod end line from remaining below the tank pressure beyond the pressure defined by the biasing force of the spring in the spring-loaded check valve 142. The biasing force of the spring-loaded check valve 142 may be selected to maintain pressures in the system above a voiding pressure.

It is to be appreciated that the above-described snubbing position 152 solves a long list of problems associated with incorporating a restricted flow position into a variable displacement pump system. First, the solution solves the problem of how to coordinate the flow from the pump, what to connect the load sense signal to and, more generally, how to provide a restricted flow position in the context of a variable displacement pump. Second, the above solution solves this problem without adding additional valve positions and without removing features. That is, the above solution is a four-position valve like known variable displacement pump valves and it includes a raise position, a lower position, a closed center position and a float position, but it also includes a restricted flow position. The above solution does so by carefully combining a restricted flow solution with a float position to create a snubbing position, which provides the desired performance without adding a valve position. Finally, and third, the above solution solves additional problems resulting from the effort to add a restricted flow position to a valve being used with a variable displacement pump. In particular, it solves the problem of pressure build up in the system where a restricted flow orifice is provided on the cap end-to-tank line, but not on the rod end-to-tank line.

Figure 8:
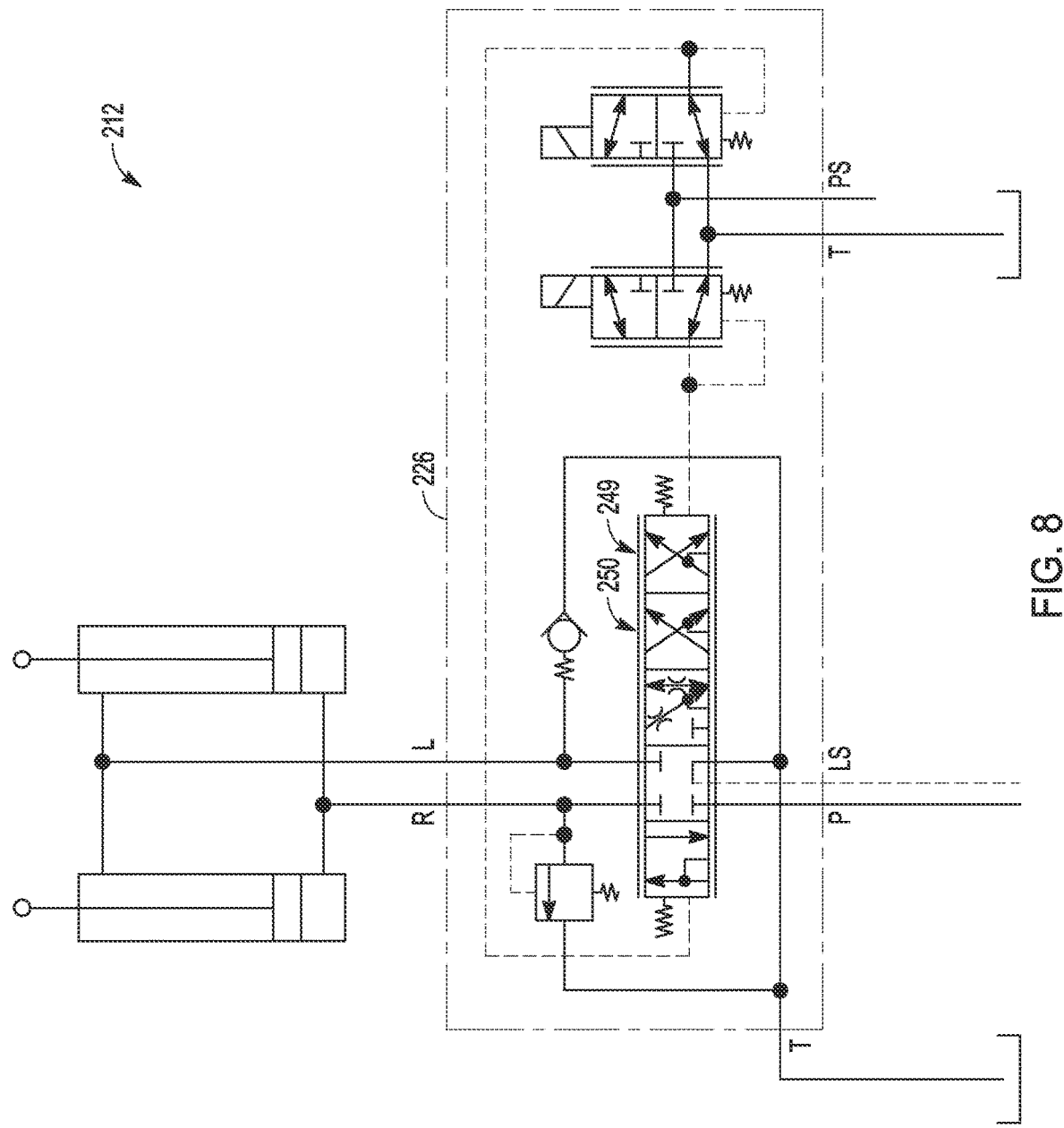
FIG. 8 is a hydraulic schematic of a truck hoist system including a closed center hoist valve with snubbing, according to one or more embodiments.
Figure 9:
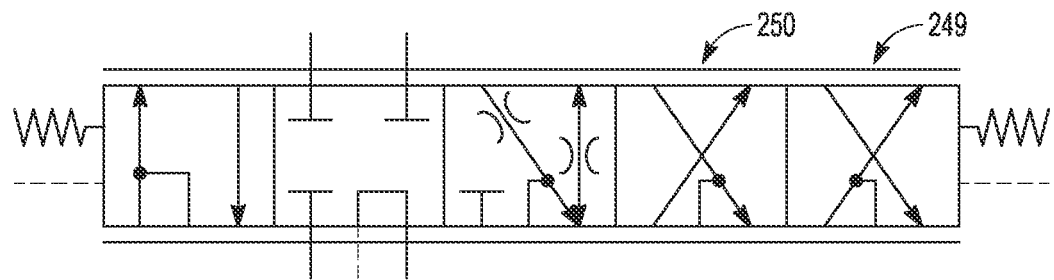
FIG. 9 is an isolated detailed view of the schematic of the closed center hoist valve depicted in FIG. 8, according to one or more embodiments.

Another embodiment of a hydraulic system 212 having a closed-center hoist valve 226 is shown in FIG. 8. The system 212 of FIG. 8 may be the same as the system 112 of FIG. 2, except that the valve spool of the valve 226 may be slightly different. A close-up view of the valve spool is shown in FIG. 9. As shown, the valve may be a 5-position, spring-centered valve. The valve 226 may be the same or similar to the valve of FIGS. 2 & 3 except that it may include an additional valve position 249 arranged outboard of the lowering position 250. That is, the other valve positions 246, 248, 250, and 252 may reflect the valve positions 146, 148, 150, and 152 of the system 112.

Figure 10:
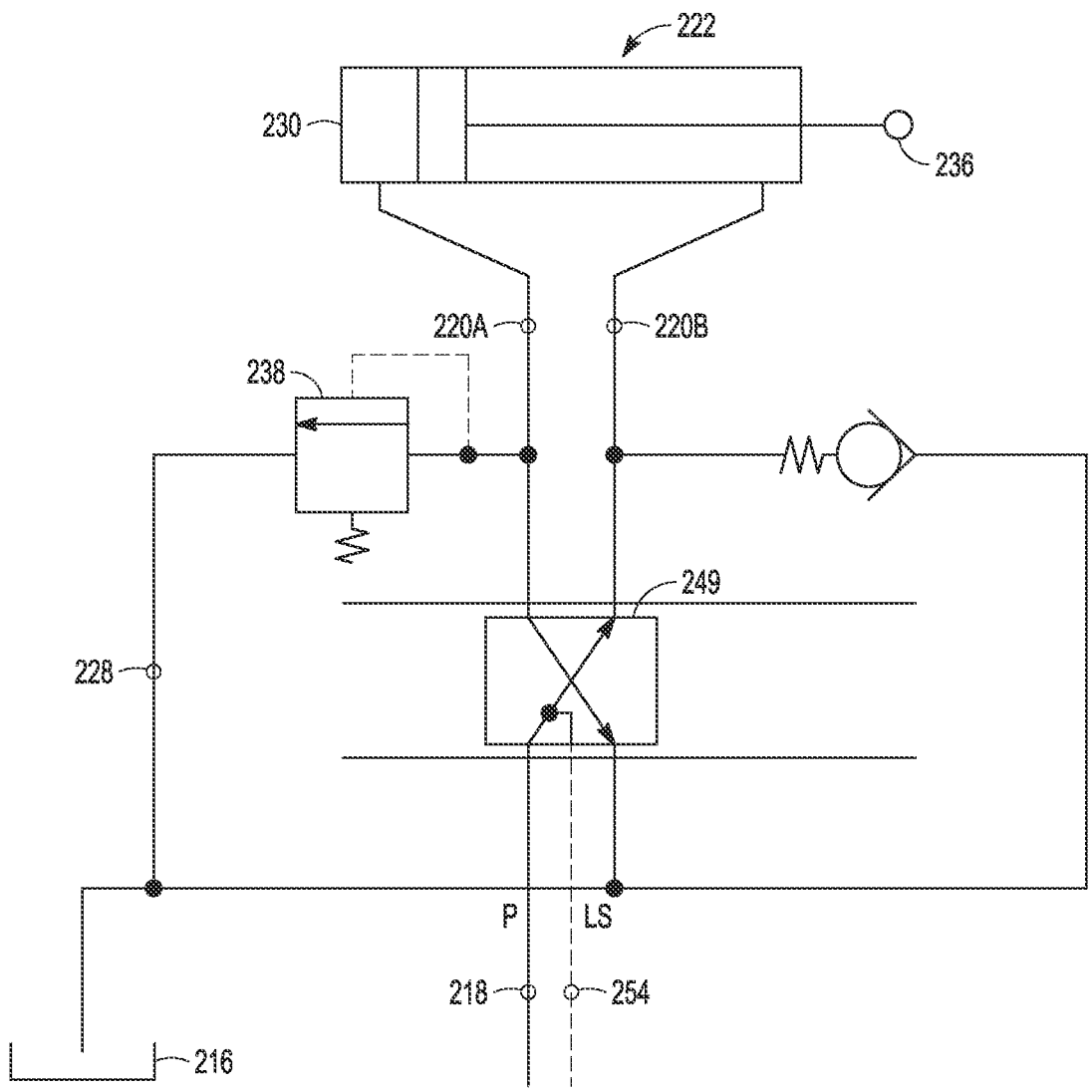
FIG. 10 is close-up view of a pressure exerting lowering position of the schematic of the valve of FIG. 9, according to one or more embodiments.

The additional valve position 249 may be a power down position 249 and an isolated view of the power down position 249 is shown in FIG. 10. This position may be the same or similar to the lowering position 150 shown in FIG. 6, except that the load sense circuit 254 in the present position may be in fluid communication with the pump 218 and the rod end line 220B rather than the tank 216 and the cap end line 220A. In particular, the power down position may place the cap end line 220A in fluid communication with the tank 216 and may place the rod end line 220B in fluid communication with the pump 218. Further, the load sense circuit 254 is in fluid communication with the rod end line 220B and the pump 218. As such, the pump 218 may pump fluid to and through the valve 226 to the rod end 236 of the hydraulic cylinder 222. This position may be useful when the bed or vessel of the truck is stuck or the linkage has been extended over center (e.g., when linkage allows for extension to a position where gravity may act to further extend the hydraulic cylinder rather than retract it). Given the stuck or over center position, and in contrast to the lowering position 150 of FIG. 6, the fluid may find some resistance and the pressure in line 220B may increase. The load sense circuit being in fluid communication therewith, may cause the pump to provide increased flow output to maintain a margin over the pressure in rod end line 220B. The pressure in the rod end line 220B may be sufficient to move the bed or vessel through its stuck or over center position. It is noted that limited pressures are anticipated in this position and a pressure relief branch is not provided. The rod end 236 may be forced by the rod end line pressure into the cylinder withdrawing the piston and causing fluid to flow out of the cap end 230 of the cylinder 222 to and through the valve 226 and back to the tank 216. Due to the pressure condition on the cap end line 220A, the pressure setting of the pressure relief valve 238 is not exceeded and fluid may refrain from flowing through the pressure relief branch 228 and may flow back to the tank 216 through the valve 226.

While a work machine 100 in the form of an underground mining truck has been shown, work machines of all types may utilize the presently described hydraulic valve and/or system having a closed center with snubbing. For example, wheel loaders, skid steers, farm equipment, trench digging equipment, and still other machines that perform work may include a hydraulic system as described herein.

INDUSTRIAL APPLICABILITY

In operation and use, the present hydraulic system may provide for cushioning of the truck bed as the truck bed approaches the truck frame during lowering. The system may also provide for flexibility for the operator as to the use of a closed-center position or a more floating condition during operation or travel of the truck because provisions may be provided to protect against pressure build up if the valve is left in the snubbing position while operating the truck.

Figure 11:
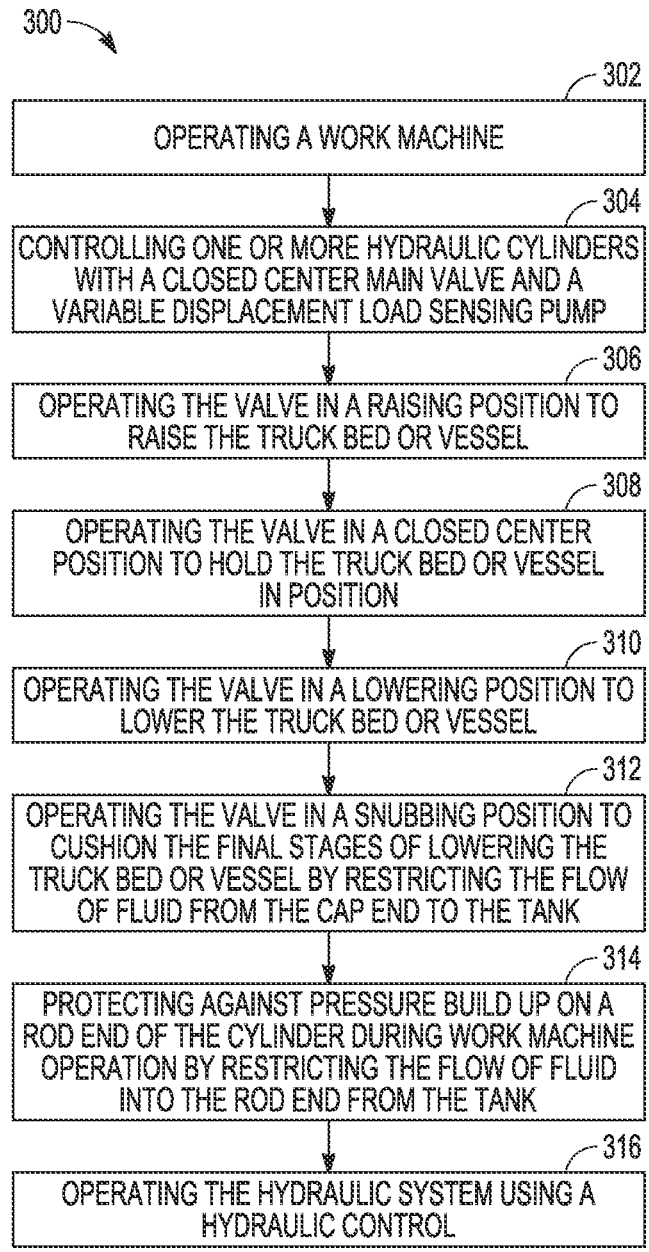
FIG. 11 is a diagram depicting a portion of a method of operation of a closed-center hoist valve with snubbing, according to one or more embodiments.

In one or more embodiments, and with reference to FIG. 11, a method (300) of operation of a machine having a closed-center valve with snubbing may be provided. For example, the method may include operating a work machine (302) and controlling one or more hydraulic cylinders with a closed-center main valve and a variable displacement load sensing pump (304). In one or more embodiments, operating a work machine may include collecting, transporting, and dumping rock, dirt, mined material, debris, or other material using a truck with a bed or vessel. The bed or vessel may be operable relative to a frame of the work machine with a hydraulic cylinder or cylinders. Still further, controlling one or more hydraulic cylinder with a main valve may include operating the valve in one or more available positions.

For example, the method may include operating the valve in a raising position to raise the truck bed or vessel. (306). In this position, hydraulic fluid may be pumped through a cap end line into the cap end of the hydraulic cylinder and hydraulic fluid may exit the rod end of the hydraulic cylinder and return to the tank. In one or more embodiments, the flow of fluid to the cap end and the flow of fluid out of the rod end may be substantially unrestricted. Moreover, a pressure relief circuit may provide return flow to the tank when a designated pressure is met or exceeded thereby establishing a maximum system pressure. A load sense circuit may be used during this process to monitor the pressure in the cap end line during raising of the truck bed or vessel and a variable displacement load sensing pump may increase the fluid output sufficiently to maintain a margin.

The method may also include operating the valve in a closed center position to hold the truck bed or vessel in position. (308) In this position, fluid communication between the cap end and all other systems may be substantially or completely closed. In addition, fluid communication between the rod end and all other systems may be substantially or completely closed. As such, this position may be suitable for holding the truck bed or vessel in any position throughout the stroke of the cylinder including a fully down position, a fully up position, or any position in between. A load sense circuit may be in communication with a tank during this process to control or limit the output of the pump.

The method may also include operating the valve in a lowering position to lower the truck bed or vessel. (310) In this position, hydraulic fluid may be pumped through a rod end line at a rate sufficient to accommodate the lowering of the truck bed or vessel under the weight of gravity. The lowering of the truck bed or vessel under the weight of gravity may force hydraulic fluid out of the cap end of the hydraulic cylinder and to the tank. In one or more embodiments, the flow of fluid to the rod end and the flow of fluid out of the cap end may be substantially unrestricted. A load sense circuit may be in communication with a tank during this process causing the pump to maintain a supply of fluid without developing large pressures.

The method may also include operating the valve in a snubbing position to cushion the final stages of lowering the truck bed or vessel. (312). Like the lowering position, hydraulic fluid flow may be based on external pressures acting on the hydraulic system such as gravity acting on the truck bed or vessel. That is, hydraulic fluid may be forced out of the cap end of the cylinder due to the weight of the truck bed or vessel acting on the rod. The hydraulic fluid forced out of the cap end may flow through the cap end line back to the tank. However, fluid flow through the main valve may be restricted by a restriction orifice thereby controlling the rate of lowering the truck bed or vessel. Moreover, the closing off of the pump may avoid the development of down pressure when the truck bed or vessel reaches its stops. The operation of the pump may be limited in this step by placing the load sense circuit in fluid communication with the tank. This in combination with a closed off pump may result in the pump limiting its fluid output or even stopping its output.

The method may also include protecting against pressure build up on a rod end of the cylinder during work machine operation. (314) That is, if an operator leaves the valve in a snubbing position while operating a truck with the bed or vessel in the lowered position, the movement of the truck bed or vessel under the external forces can cause pressure to build up in the rod end of the cylinder. However, by restricting the flow to the rod end with restriction orifice 158, such pressure build up may be prevented or reduced. That said, where the restriction orifice creates a sufficient pressure differential between the tank and the rod end of the cylinder, the method may include operation of a spring-loaded check valve to avoid voiding.

The operation of the hydraulic system may be performed using a hydraulic control. (316) The hydraulic control may be in fluid communication with the valve and may function to control the position of the valve. In particular, the position of the valve may be controlled by shifting the position of the valve against a spring centering force.

In an example, a snubbing position for use in a closed-center hydraulic valve may include a pump fluid pathway configured for closing off fluid flow from the pump. The snubbing position may also include a cap end fluid pathway configured for placing a cap end of a hydraulic cylinder in fluid communication with a tank and comprising a first end, a second end, and a first restricted flow orifice arranged between the first end and the second end. The snubbing position may also include a rod end fluid pathway configured for placing a rod end of the hydraulic cylinder in fluid communication with the tank and comprising a third end, a fourth end, and a second restricted flow orifice arranged between the third end and the fourth end. The snubbing position may also include a load sense fluid pathway configured for placing tank in fluid communication with the cap end fluid pathway on a tank side of the first restricted flow orifice. In one or more embodiments, the snubbing position the second end of the cap end fluid pathway and the fourth end of the rod end fluid pathway may be combined within the valve and adapted for connection to the tank.

The above detailed description is intended to be illustrative, and not restrictive. The scope of the disclosure should, therefore, be determined with references to the appended claims, along with the full scope of equivalents to which such claims are entitled.

What is claimed is:

1. A valve for controlling a hydraulic cylinder on a work machine, the valve comprising:
   a raising position configured for placing a pump in fluid communication with a cap end of the hydraulic cylinder via a cap end line and for placing a tank in fluid communication with a rod end of the hydraulic cylinder via a rod end line;
   a closed center position configured for closing off fluid communication to the cap end line and the rod end line;
   a lowering position configured for placing the pump in fluid communication with the rod end of the hydraulic cylinder via the rod end line and for placing the tank in fluid communication with the cap end of the hydraulic cylinder via the cap end line;
   a snubbing position configured for placing the cap end in restricted flow fluid communication with the tank via the cap end line and for placing the rod end in restricted flow fluid communication with the tank via the rod end line; and
   a flow path arranged between the rod end line and the tank and including a check valve oriented to allow flow of fluid from the tank to the rod end line when a pressure in the rod end line falls below the tank pressure by a designated margin.

2. The valve of claim 1, wherein the snubbing position is further configured for placing a load sense circuit in fluid communication with the tank.

3. The valve of claim 1, wherein the raising position is further configured for placing the cap end line in fluid communication with a load sense circuit.

4. The valve of claim 3, wherein each of the closed center position and the lowering position is further configured for placing the load sense circuit in fluid communication with the tank.

5. The valve of claim 1, further comprising a pressure relief branch arranged between the cap end line and the tank and including a pressure relief valve.

6. The valve of claim 5, wherein the pressure relief valve is configured to open when the pressure in the cap end line reaches or exceeds a designated pressure, wherein fluid flow from the cap end line to the tank is provided.

7. The valve of claim 1, wherein the snubbing position comprises a primary restricted flow orifice in communication with the cap end line and a secondary restricted flow orifice in communication with the rod end line.

8. The valve of claim 1, further comprising a power down position configured for placing the pump and the load sense circuit in fluid communication with the rod end of the hydraulic cylinder via the rod end line and for placing the tank in fluid communication with the cap end of the hydraulic cylinder via the cap end line.

9. A hydraulic system for raising and lowering a truck bed relative to a frame, the system comprising:
   a tank;
   a variable displacement pump in fluid communication with the tank to supply pressurized hydraulic fluid;
   a hydraulic cylinder configured for extending and retracting to pivot the truck bed relative to the frame and having a cap end and a rod end; and
   a valve arranged between the tank and the hydraulic cylinder and between the variable displacement pump and the hydraulic cylinder, the valve comprising:
   a raising position;
   a closed center position;
   a lowering position;
   a snubbing position configured for placing the cap end in restricted flow fluid communication with the tank via a cap end line; and
   a flow path arranged between the rod end line and the tank and including a check valve oriented to allow flow of fluid from the tank to the rod end line when a pressure in the rod end line falls below the tank pressure by a designated margin.

10. The system of claim 9, wherein the snubbing position of the valve is further configured for placing the rod end in restricted flow fluid communication with the tank via a rod end line.

11. The system of claim 10, wherein the snubbing position of the valve further configured for placing a load sense circuit in fluid communication with the tank.

12. The system of claim 9, wherein the raising position of the valve is further configured for placing the cap end line in fluid communication with a load sense circuit.

13. The system of claim 9, further comprising a pressure relief branch arranged between the cap end line and the tank and including a pressure relief valve.

14. The system of claim 13, wherein the pressure relief valve is configured to open when the pressure in the cap end line reaches or exceeds a designated pressure, wherein fluid flow from the cap end line to the tank is provided.

15. A method of operating a work machine, comprising:
   operating a valve in a raising position to raise a truck bed of the work machine with a hydraulic cylinder;
   operating the valve in a lowering position to lower the truck bed with the hydraulic cylinder; and
   operating the valve in a snubbing position as the truck bed approaches a frame of the work machine, wherein:
   the snubbing position places a cap end of the hydraulic cylinder in fluid communication with the tank via a first restricted flow orifice that restricts flow out of the cap end of the cylinder; and
   the snubbing position places a rod end of the hydraulic cylinder in fluid communication with the tank via a second restricted flow orifice that restricts flow into the rod end of the cylinder.

16. The method of claim 15, further comprising bypassing the valve with fluid flow from the tank to the rod end of the hydraulic cylinder when a pressure in the rod end drops below a tank pressure by a designated amount.

* * * * *